US008447954B2

(12) United States Patent  
Jia (10) Patent No.: US 8,447,954 B2  
(45) Date of Patent: May 21, 2013

(54) PARALLEL PIPELINED VECTOR REDUCTION IN A DATA PROCESSING SYSTEM

(75) Inventor: Bin Jia, West New York, NJ (US)

(73) Assignee: International Business Machines Corporation, Armonk, NY (US)

(*) Notice: Subject to any disclaimer, the term of this patent is extended or adjusted under 35 U.S.C. 154(b) by 929 days.

(21) Appl. No.: 12/554,074

(22) Filed: Sep. 4, 2009

(65) Prior Publication Data

US 2011/0060891 A1 Mar. 10, 2011

(51) Int. Cl.
    *G06F 15/16* (2006.01)
(52) U.S. Cl.
    USPC .............................................. 712/28; 709/201
(58) Field of Classification Search .................... 712/222
    See application file for complete search history.

(56) References Cited

U.S. PATENT DOCUMENTS

| 5,533,169 | A  | * | 7/1996  | Burnod et al. ................ 706/41   |
| 6,023,751 | A  | * | 2/2000  | Schlansker et al. ............... 712/1 |
| 6,104,374 | A  | * | 8/2000  | Sullivan et al. ............... 345/694 |
| 6,212,617 | B1 |   | 4/2001  | Hardwick                               |
| 6,292,822 | B1 | * | 9/2001  | Hardwick .................... 718/105   |
| 6,788,302 | B1 | * | 9/2004  | Ditlow et al. ................ 345/505  |
| 6,895,115 | B2 |   | 5/2005  | Tilton                                 |
| 7,313,582 | B2 |   | 12/2007 | Bhanot et al.                          |
| 7,376,812 | B1 | * | 5/2008  | Sanghavi et al. ............... 712/24  |
| 7,451,278 | B2 |   | 11/2008 | Feind et al.                           |
| 7,937,559 | B1 | * | 5/2011  | Parameswar et al. ........... 712/37   |
| 8,041,551 | B1 | * | 10/2011 | Pakyari et al. ................. 703/13 |
| 2002/0181390 | A1 | * | 12/2002 | Mody et al. .................... 370/208 |
| 2002/0198709 | A1 | * | 12/2002 | Takagi ......................... 704/233  |
| 2006/0041610 | A1 | * | 2/2006  | Hokenek et al. ............... 708/620  |
| 2008/0092124 | A1 | * | 4/2008  | Archambault et al. ....... 717/140     |
| 2008/0127203 | A1 |   | 5/2008  | Huang                                  |
| 2008/0148013 | A1 | * | 6/2008  | Jia ................................ 712/28 |
| 2008/0183779 | A1 |   | 7/2008  | Jia                                    |
| 2008/0301683 | A1 |   | 12/2008 | Archer                                 |
| 2009/0007140 | A1 |   | 1/2009  | Jia                                    |
| 2009/0064176 | A1 |   | 3/2009  | Ohly et al.                            |
| 2009/0089544 | A1 | * | 4/2009  | Liu ................................ 712/30 |

\* cited by examiner

*Primary Examiner* — Keith Vicary  
(74) *Attorney, Agent, or Firm* — Yudell Isidore Ng Russell PLLC (57) ABSTRACT

A parallel processing data processing system builds at least one data structure indicating a communication schedule for a plurality of processes each having a respective one of a plurality of equal length vectors formed of multiple equal size chunks. The data processing system, based upon the at least one data structure, communicates chunks of the plurality of vectors among the plurality of processes and performs partial reduction operations on chunks in accordance with the communication schedule. The data processing system then stores a result vector representing reduction of the plurality of vectors.

15 Claims, 6 Drawing Sheets

PARALLEL PIPELINED VECTOR REDUCTION IN A DATA PROCESSING SYSTEM

This invention was made with United States Government support under Agreement No. HR0011-07-9-0002 awarded by DARPA. THE GOVERNMENT HAS CERTAIN RIGHTS IN THE INVENTION.

BACKGROUND OF THE INVENTION

1. Technical Field

The present invention relates in general to data processing systems and, in particular, to improvements in multiprocessor data processing systems.

2. Description of the Related Art

In parallel computing environments, the Reduce operation is frequently used to combine multiple input vectors of equal length utilizing a desired mathematical or logical operation to obtain a result vector of the same length. As an example, the reduction operation can be a vector summation or a logical operation, such as a maximum. A long term profiling study has indicated that a conventional application having parallel processing capabilities may spend 40% or more of the cycles used for parallel processing to perform Reduce operations.

The Message Passing Interface (MPI) is a language-independent communications protocol commonly used to program parallel computers. MPI defines several collective communication interfaces for Reduce operations, such as MPI_REDUCE and MPI_ALLREDUCE. In MPI, the MPI_REDUCE operation is a global operation across all members of a process group defined by the MPI communicator. The MPI Reduce operation returns the result vector at one process specified by the user, known as the root. In the following discussion, it will be assumed that a commutative Reduce operation is employed and the N participating processes are ranked from 0 to N−1, with the root having a rank of 0.

To reduce vectors having short lengths, the best known MPI_REDUCE algorithm is the Minimum Spanning Tree (MST) algorithm, in which the root process is the root of a MST consisting of all participating processes. A process in the tree first receives vectors from all of its children, combines received vectors and its own input vector, and then sends the result vector to its parent. This bottom-up approach continues until the root produces the result vector by combining its input vector and all input vectors of its children.

The MST algorithm does not work as well, however, if the vectors are long. Efficient long vector algorithms for MPI_REDUCE focus on better exploitation of available network bandwidth and processor computing power, instead of minimized message start-up and latency overhead. One of the algorithms widely adopted for reduction of long vectors is the Recursive Halving Recursive Doubling (RHRD) algorithm, in which each of the N participating processes first takes log(N) steps of computation and communication.

During each step k, process i and process j exchange half of their intermediate reduction results of step (k−1), where j=i^ A mask, a carat (^) denotes a bitwise exclusive-OR operation, and mask is the 1's binary representation left shifting (k−1) bits. If i<j, process i sends the second half of the intermediate result, receives the first half of the intermediate result, and combines the received half with the half that was not sent. This procedure continues recursively, halving the size of exchanged/combined data at each step, for a total of log(N) steps. At the end of the steps, each process owns 1/N of the resulting vector: process 0 owns the first 1/N, process 1 owns the second 1/N, process i owns the (i+1)th 1/N and so on.

All processes then perform a gather operation to gather the pieces back by the root process from other processes. The gather operation also consists of log(N) steps, for a total Reduce operation length of 2*log(N) steps. During step k of the gather, process i sends the partial results it has to process j, where both i and j are less than $N/2^k$, j<i, j=^mask and mask is the 1's binary representation left shifting (k−1) bits. These steps continue recursively, doubling the size of the data passed at each step. Finally, the root process 0 obtains the final result of the reduce operation of the entire vector.

The above description of RHRD algorithm applies to cases where N is an integer power of two. When N is not an integer power of two (as is common), the RHRD algorithm includes an extra preparation step prior to the exchange of intermediate results. In the preparation step, processes from N' to N−1 send their input vectors to processes from 0 to r−1, where r=N−N' and N' is the largest integer power of two less than N. Specifically, process i sends its vector to process i−N' if i>N'. Processes from 0 to r−1 then perform local reduce operations on the received vectors and their own input vectors and will use the results as their input vectors in the above-described algorithm. Processes from N' to N−1 do not participate in the remainder of the MPI_REDUCE operation, and processing by the rest of the processes remains the same as in the case in which N is an integer power of two.

Figure 6:
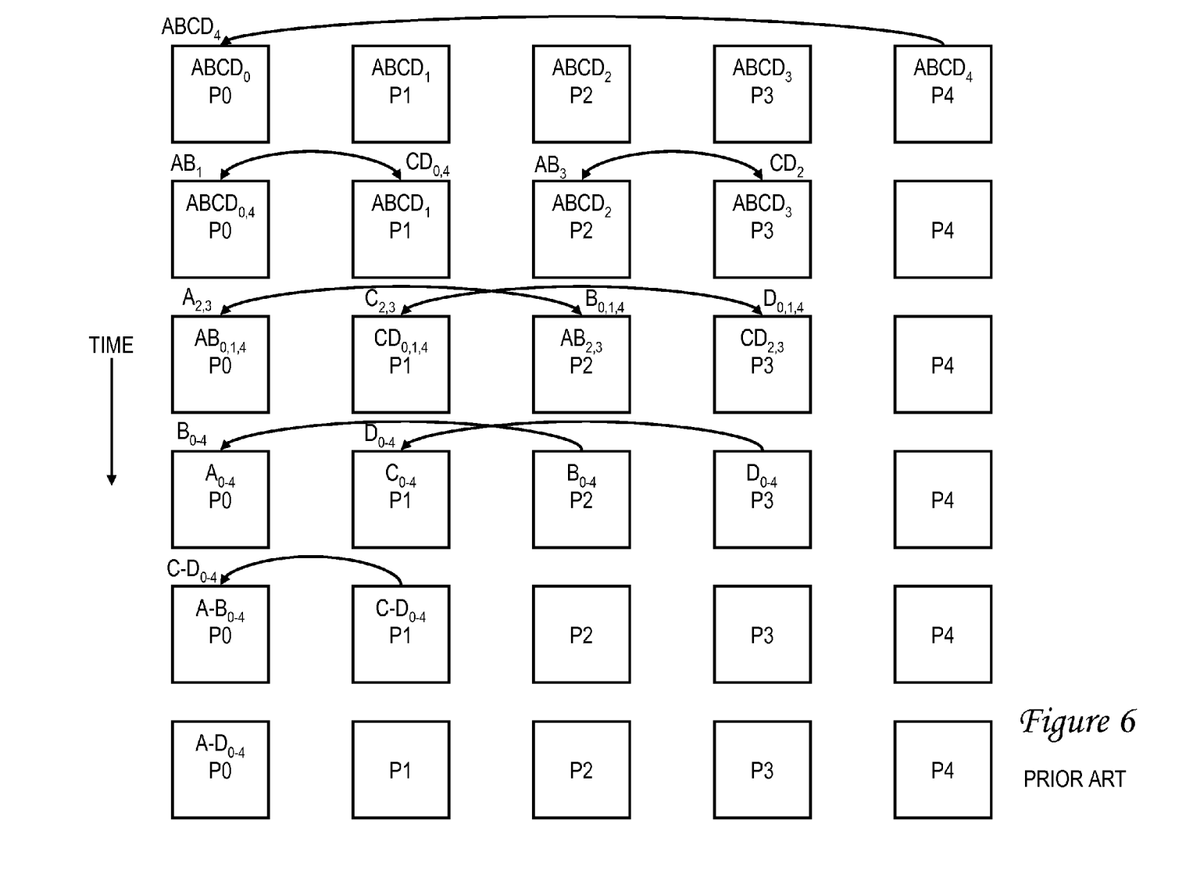
FIG. 6 depicts an example of a MPI_REDUCE operation on five processes using the conventional Recursive Halving Recursive Doubling (RHRD) algorithm.

FIG. 6 depicts an example of MPI_REDUCE operation on five processes using the conventional RHRD algorithm. The example assumes a vector size of 4, with each vector containing elements ABCD. Partial reduce operation results are represented by element and rank number (in subscript), e.g., $A\text{-}B_{0\text{-}3}$ represents reduce results of elements (i.e., vector halves) A and B of processes 0, 1, 2 and 3.

The conventional RHRD algorithm does not scale well. Modern parallel high performance computing applications often require MPI_REDUCE operations on tens of thousands or even hundreds of thousands of processes. Even When the vectors are lone (e.g., 1 MB), the RHRD algorithm breaks the vector into very small chunks, e.g., 64 bytes when N=16K, since each of N' processes gets 1/N' th of the final result vector at the end of the recursive halving and before the recursive doubling. With a large number of short messages each carrying a small chunk of the vector, message start-up overhead is high and available network link bandwidth is not fully utilized.

SUMMARY OF THE INVENTION

In one embodiment, a parallel processing data processing system builds at least one data structure indicating a communication schedule for a plurality of processes each having a respective one of a plurality of equal length vectors formed of multiple equal size chunks. The data processing system, based upon the at least one data structure, communicates chunks of the plurality of vectors among the plurality of processes and performs partial reduction operations on chunks in accordance with the communication schedule. The data processing system then stores a result vector representing reduction of the plurality of vectors.

DETAILED DESCRIPTION OF ILLUSTRATIVE EMBODIMENT

Figure 1:
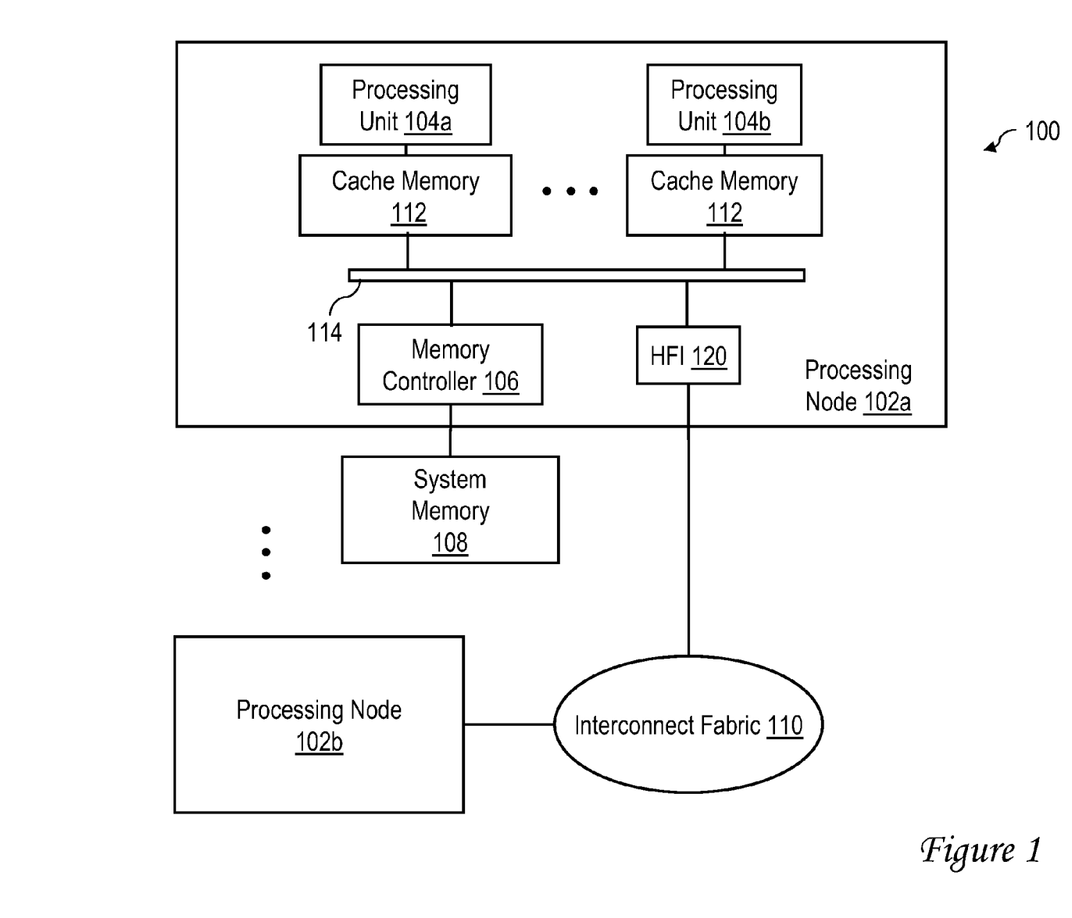
FIG. 1 is a high level block diagram of an exemplary data processing system in accordance with one embodiment.

With reference now to the figures, wherein like reference numerals refer to like and corresponding parts throughout, and in particular with reference to FIG. 1, there is illustrated a high-level block diagram depicting an exemplary data processing system 100 in accordance with one embodiment. As shown, data processing system 100 includes multiple processing nodes 102a, 102b for processing data and instructions. Processing nodes 102 are coupled via a host fabric interface (HFI) to an interconnect fabric 110 that supports data communication between processing nodes 102 in accordance with one or more interconnect and/or network protocols. Interconnect fabric 110 may be implemented, for example, utilizing one or more buses, switches and/or networks.

As utilized herein, the term processing node (or simply node) is defined as the set of computing resources that form the domain of a coherent operating system (OS) image. For clarity, it should be understood that, depending on configuration, a single physical system may include multiple nodes. The number of processing nodes 102 deployed in a given system is implementation-dependent and can vary widely, for example, from a few nodes to many thousands of nodes.

Each processing node 102 may be implemented, for example, as a single integrated circuit chip (e.g. system-on-a-chip (SOC)), multi-chip module (MCM), or circuit board, which contains one or more processing units 104 (e.g., processing units 104a, 104b) for processing instructions and data. Each processing unit 104 may concurrently execute one or more hardware threads of execution.

As shown, each processing unit 104 is supported by cache memory 112, which contains one or more levels of in-line or lookaside cache. As is known in the art, cache memories 112 provide processing units 104 with low latency access to instructions and data received from source(s) within the same processing node 102a and/or remote processing node(s) 102b. The processing units 104 within each processing node 102 are coupled to a local interconnect 114, which may be implemented, for example, with one or more buses and/or switches. Local interconnect 114 is further coupled to HFI 120 to support data communication between processing nodes 102.

As further illustrated in FIG. 1, processing nodes 102 typically include at least one memory controller 106, which may be coupled to local interconnect 114 to provide an interface to a respective physical system memory 108. In alternative embodiments of the invention, one or more memory controllers 106 can be coupled to interconnect fabric 110 or directly to a processing unit 104 rather than a local interconnect 114.

Those skilled in the art will appreciate that processing system 100 of FIG. 1 can include many additional non-illustrated components, such as interconnect bridges, non-volatile storage, ports for connection to networks or attached devices, etc. Because such additional components are not necessary for an understanding of the present invention, they are not illustrated in FIG. 1 or discussed further herein.

Figure 2:
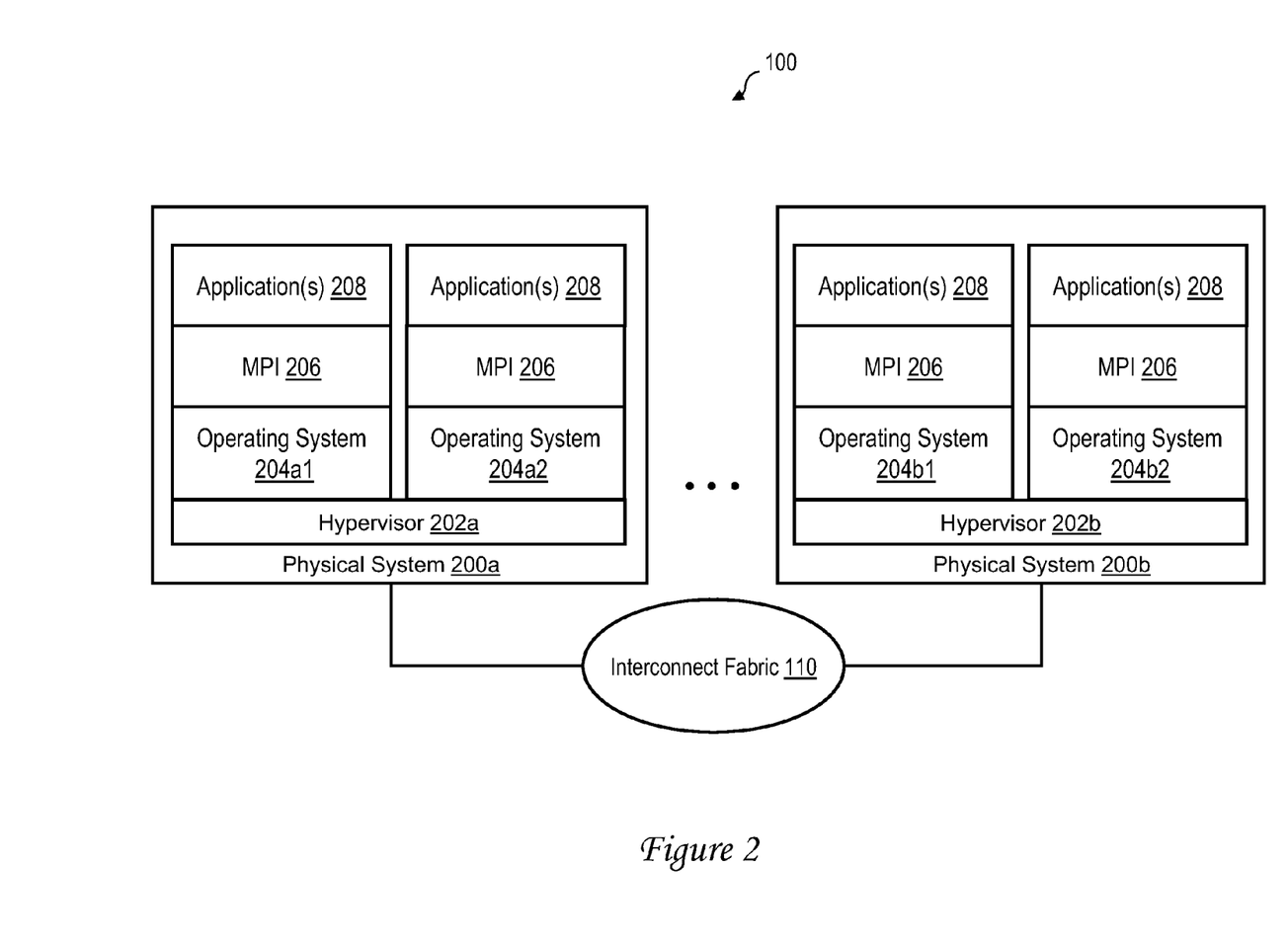
FIG. 2 is a layer diagram of an exemplary software configuration of the exemplary data processing system of FIG. 1.

Referring now to FIG. 2, there is depicted a high level view of an exemplary software environment for data processing system 100 in accordance with one embodiment. As depicted, in the exemplary embodiment data processing system 100 includes at least two physical systems 200a and 200b coupled by interconnect fabric 110. In the depicted embodiment, each physical system 200 includes at least two concurrent nodes. That is, physical system 200a includes a first node corresponding to operating system 204a1 and a second node corresponding to operating system 204a2. Similarly, physical system 200b includes a first node corresponding to operating system 204b1 and a second node corresponding to operating system 204b2. The operating systems 204 concurrently executing within each physical system 200 may be homogeneous or heterogeneous.

Each physical system 200 further includes an instance of a hypervisor 202 (also referred to as a Virtual Machine Monitor (VMM)), such as hypervisor 202a and hypervisor 202b. Hypervisor 202 is a program that manages the full virtualization or paravirtualization of the resources of physical system 200 and serves as an operating system supervisor. As such, hypervisor 202 governs the creation and destruction of nodes and the allocation of the resources of the physical system 200 between nodes.

At least some (and in the illustrated embodiment, all) of operating systems 204 include and/or support a message passing interface (MPI) 206, which may each comply, for example, with the MPI 1.2 (commonly referred to as MPI-1) or MPI 2.1 (commonly referred to as MPI-2) standard promulgated by the MPI Forum. As will be appreciated, each MPI 206 provides a set of routines callable from applications 208 of any language (e.g., C, C++, Fortran, Java, etc.) capable of interfacing with the MPI routine libraries. The library routines of MPI 206 can include computation routines (e.g., MPI_REDUCE), message passing, data synchronization and process management routines, as well as other routines supporting parallel programming.

In accordance with a preferred embodiment, MPI 206 implements an MPI_REDUCE routine in a manner that utilizes communication links of data processing system 100 in accordance with a predetermined schedule in order to complete the communication between processes efficiently and without contention. In particular, the MPI_REDUCE process decomposes a plurality of vectors into M chunks of equal size and pipelines each chunk individually along log(N) different pipelines consisting of N processes in parallel. The MPI_REDUCE routine is efficient because communication on the pipelines is scheduled to be non-conflicting and up to all available network links are utilized. The MPI_REDUCE routine is also scalable because the number of chunks M is not dependent on the number of the processes, but can instead be selected based on trade-off between fully utilizing the bandwidth of any network link and utilizing as many network links as are available.

Figure 3:
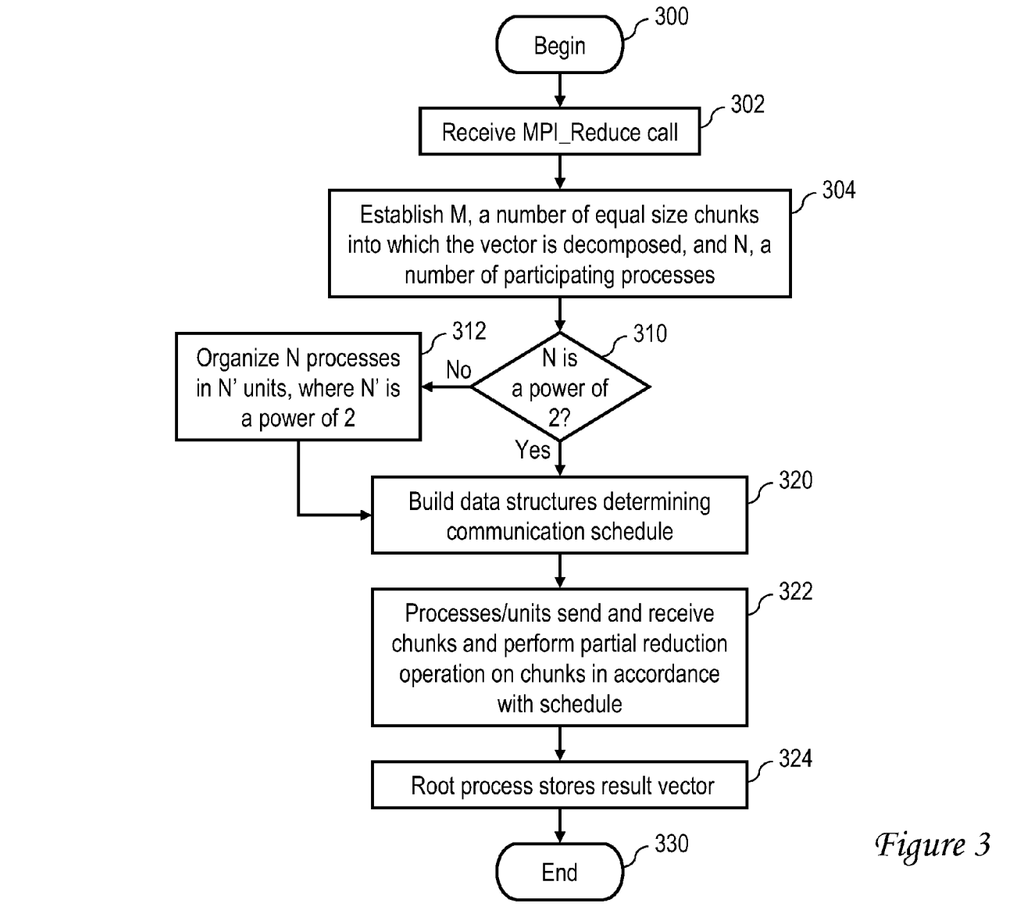
FIG. 3 is a high level logical flowchart of an exemplary process for performing a Reduce operation, such as an MPI_REDUCE operation, in a parallel programming environment.

With reference now to FIG. 3, there is illustrated a high level logical flowchart of an exemplary process of performing a Reduce operation in a parallel programming environment. As a logical flowchart, the illustrated steps are presented in a logical rather than strictly chronological order, meaning that in some cases steps can be performed concurrently or in a different order than shown. While not restricted to MPI implementations, for simplicity the process of FIG. 3 is described with reference to the MPI environment of FIGS. 1 and 2.

The process of FIG. 3 begins at block 300 and then proceeds to block 302, which illustrates an instance of MPI 206 receiving an MPI_REDUCE call from one of applications 208 in its node. The MPI_REDUCE call includes a number of parameters, which indicate the vector to be reduced, the desired reduction operation, the processes participating in the reduction (i.e., the MPI communicator), and the root process. In response to receipt of the MPI_REDUCE call, MPI 206 establishes two integers for the reduction operation based upon the specified parameters: M, a number of equal size chunks into which the vector is to be decomposed, and N, a number of processes in the MPI communicator (block 304). Although the selection of M can be arbitrary, in order to have good performance M should be selected such that each chunk is sufficiently large and M is relatively large compared with the value of log(N), but in any event is at least 2.

MPI 206 determines at block 310 whether integer N is an integer power of two. If so, N', a number of "units" each containing at least one process, is equal to N, and the process shown in FIG. 3 proceeds to block 320, which is described below. If not, MPI 206 organizes the N processes into N' units, where N' is the largest integer power of two that is less than N and each of the N' units includes two or fewer processes (block 312). Following either block 310 or block 312, the process depicted in FIG. 3 proceeds to block 320, which depicts each of the N processes building data structures determining a schedule of communication between the N processes for the reduction.

In an exemplary embodiment, the data structures built at block 320 include two integer arrays each including log(N') elements, which are referred to herein as BR (binary representation) and DIS (distance). For a process i, BR[k] stores the value of bit k in the binary representation of integer i, and DIS[k] stores the distance between bit k and the first non-zero bit to its right in the binary representation of integer i. If bit k is the rightmost bit in the binary representation of integer i, then k=0, or if bits to the right of bit k are all zeros, then define DIS[k]=k+log(N')−l, where bit l is the leftmost nonzero bit in the binary representation of i. Furthermore, if i=0, then BR[k]=0 and DIS[k]≡log(N') for all 0<k<log(N'). For each process belonging to a multi-process unit, the process additionally builds a third integer array SW (switch) of log(N') elements. For unit i and 0<k<=log(N'), SW[k] records the number of nonzero bits between bit 0 and bit k in i's binary representation.

As indicated at block 322 of FIG. 3, the N processes then send and receive chunks of vectors and perform partial reduction operations on the chunks of the vectors in accordance with the schedule. As explained above, the final result of all the partial reduction operations and communication is a single vector at the root process indicated by the parameters of the MPI_REDUCE call.

Figure 4:
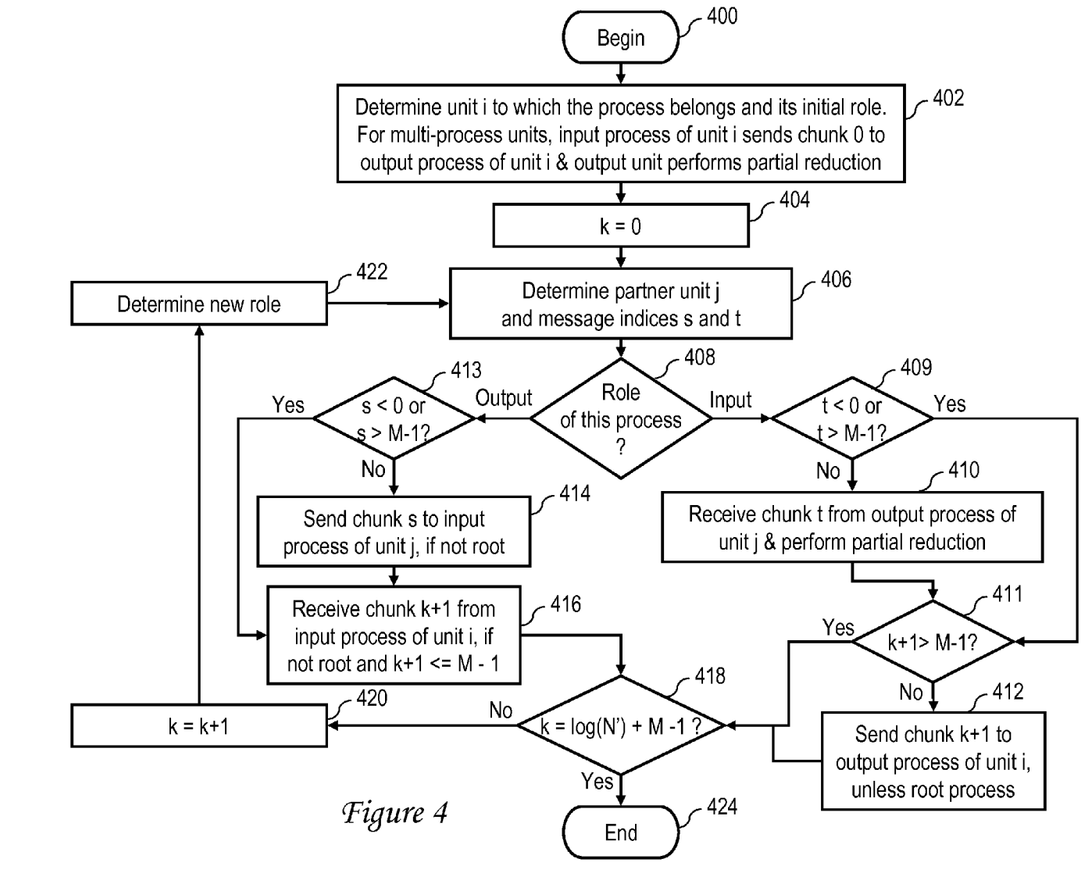
FIG. 4 is a depicts an exemplary method of scheduled inter-process communication in a Reduce operation in accordance with one embodiment.

Referring now to FIG. 4, there is depicted an exemplary method of performing the scheduled inter-process communication and partial reduction of vectors shown generally at block 322 of FIG. 3. In the illustrated method, a unit i sends chunk s and receives chunk t from unit j during step k, where $0<=k<=\log(N')+M-1$.

The method depicted in FIG. 4 begins at block 400 and then proceeds to block 402, which illustrates a process determining the unit i to which it belongs and its initial role, that is, whether the process will serve as an input process or output process of unit i. During a step of the reduction process, the output process of unit i may send a chunk to another unit, and the input process may receive a chunk from another unit. The input process of unit i may also send a chunk to the output process of unit i. A process may change roles between an input process and an output process from step to step.

In a one-process unit, the single process is considered to be both the input process and the output process of the unit. In cases in which N is not an integer power of two, meaning that at least one unit contains multiple processes, a preferred embodiment groups processes such that units I through r each have two processes and other units each have one process. More specifically, in an exemplary embodiment, unit i consists of process i and N'+i−1 if 0<i<=r. For simplicity, if 0<i<=r, it will be assumed that process i will be the initial output process of the unit and process N'+i−1 be the input process.

In cases in which N is not an integer power of two, the input process of each multi-process unit sends its chunk 0 to the output process of the same unit, as also shown at block 402. In response to receiving the chunk 0 of the input process, the output process performs the reduction operation on the received chunk and its own chunk 0. Of course, for units containing a single process, no communication of chunk 0 or partial reduction is performed.

At block 404 of FIG. 4, the step variable k is initialized to zero. The process proceeds from block 404 to block 406, which depicts a process determining message indices s and t and its partner unit j with which it may communicate a message containing a chunks of a vector during step k. If the percent sign (%) denotes the modulo operation and k'=k % log(N'), then:

j=i^mask and mask is 1's binary representation left shifting k' bits s=k−BR[k']*DIS[k']

t=k−(1−BR[k']*DIS[k']

Block 408 illustrates that the process then takes possible action depending upon its role in the present step k. The actions taken by an input process are depicted at blocks 409-412, and the actions taken by an output process are depicted at blocks 413-416. Referring first to blocks 409-410, if the process is an input process, the process receives chunk t from the output process of unit j and performs the specified partial reduction operation on the received chunk t and its local intermediate result, unless t<0 or t>M−1 in which case the receive operation and partial reduction operation are skipped. As further indicated at blocks 411-412, the process also sends chunk k+1 to the output process of unit i, unless the input process is the root process, when k+1<M−1 (block 412).

As indicated at blocks 413-414, if the process is an output process and not the root process, the process sends chunks s to the input process of unit j during step k, unless s<0 or s>M−1 in which case the sending operation is skipped. This output process also receives chunk k+1 from the input process of unit i, when k+1<M−1 (block 416).

Following any of blocks 411, 412 or block 416, the process determines at block 418 whether or not step index k has reached log(N')+M−1. If so, the method depicted in FIG. 4 terminates at block 424. If, however, k has not reached log(N')+M−1, the process increments k at block 420. The process also determines its role for the next step k at block 422.

In one preferred embodiment, the two processes within a given multi-process unit recalculate roles before the scheduled communication and computation for the step k if BR[k']=1 and otherwise keep their roles from the previous step. To recalculate roles for step k, a process calculates two values u and v by:

$$u=SW[\log(N')-1]*(k/\log(N'))+SW[k']$$

$$v=u+k/\log(N')+1$$

With these two values, the roles of the processes in the two-process unit i and its partner unit j can then be determined by:

If $0<i>=r$, process i is the output process and process $N'+i-1$ is the input process of unit i if u is an even number (the roles are reversed if u is an odd number); and If $0<j<=r$, process j is the output process and process $N'+j-1$ is the input process of unit j if v is an even number (the roles are reversed if v is an odd number).

From block 422, the method of FIG. 4 returns to block 406 and following blocks, which have been described.

Returning now to FIG. 3, when the reduction performed in block 322 is complete, the root process stores the result vector in a buffer (e.g., a location in a system memory 108) designated by the MPI_REDUCE parameters (block 324). Thereafter, the process given in FIG. 3 terminates at block 330, generally by supplying a return code to the calling application 208.

Figure 5:
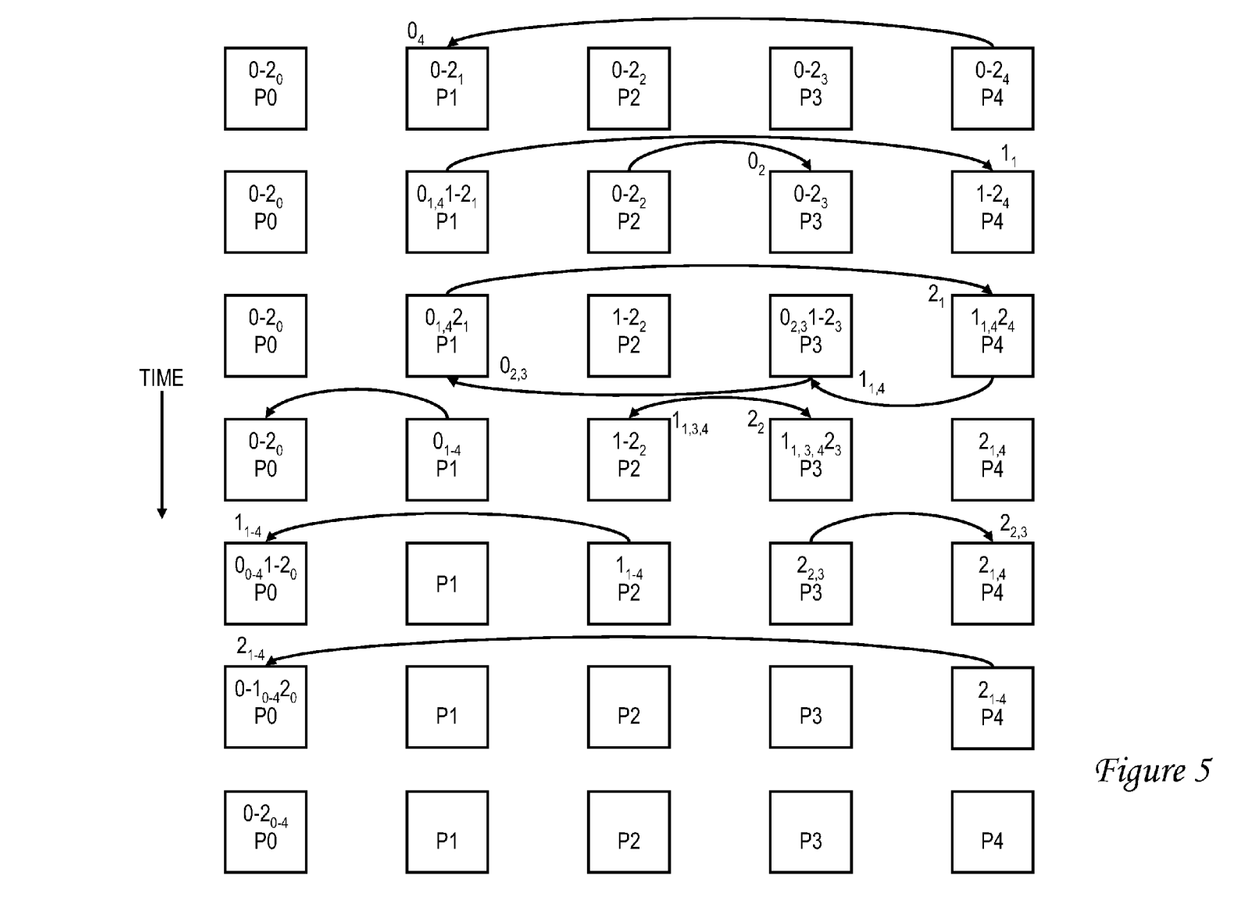
FIG. 5 is a time-space diagram of inter-process communication in an exemplary MPI_REDUCE operation.

Referring now to FIG. 5, there is depicted a time-space diagram of the inter-process communication employed in an exemplary MPI_REDUCE operation in accordance with FIG. 3. In the exemplary MPI_REDUCE operation, five processes are utilized, and each of the vectors is decomposed into three chunks respectively labeled by integers from 0 to 2. Unit 1 is a two-process unit, consisting of process 1 and 4, with process 1 initially being designated as the output process and process 4 initially being designated the input process. Partial reduce operation results are represented in FIG. 4 by chunk number and rank number (in subscript), e.g., $0\text{-}2_{1,3,4}$ represents reduction results of chunks 0, 1 and 2 of processes 1, 3 and 4.

Table I below shows the unit organization and the scheduling arrays built at step 320 of FIG. 3 for the above example.

TABLE I

| Unit (Process) | BR[1] | BR[0] | DIS[1] | DIS[0] | SW[1] | SW[0] |
|---|---|---|---|---|---|---|
| 0 (0) | 0 | 0 | 2 | 2 | 0 | 0 |
| 1 (1, 4) | 0 | 1 | 1 | 2 | 1 | 1 |
| 2 (2) | 1 | 0 | 2 | 1 | 0 | 1 |
| 3 (3) | 1 | 1 | 1 | 1 | 2 | 1 |

Table II additionally summarizes the calculated values (u, v, s, t, j) for each process during each or the steps of the exemplary reduction operation.

TABLE II

| | Step | | | | |
|---|---|---|---|---|---|
| Preparation | process 0 | process 1 | process 2 | process 3 | process 4 |
| 0 | (0, 1, 0, −2, 1) | (1, 2, −2, 0, 0) | (0, 1, 0, −1, 3) | (1, 2, −1, 0, 2) | (1, 2, −2, 0, 0) |
| 1 | (0, 1, 1, −1, 2) | (1, 2, 1, 0, 3) | (1, 2, −1, 1, 0) | (2, 3, 0, 1, 1) | (1, 2, 1, 0, 3) |
| 2 | (0, 2, 2, 0, 1) | (2, 4, 0, 2, 0) | (1, 3, 2, 1, 3) | (3, 5, 1, 2, 2) | (2, 4, 0, 2, 0) |
| 3 | (0, 2, 3, 1, 2) | (2, 4, 3, 2, 3) | (2, 4, 1, 3, 0) | (4, 6, 2, 3, 1) | (2, 4, 3, 2, 3) |
| 4 | (0, 3, 4, 2, 1) | (3, 6, 2, 4, 0) | (2, 5, 4, 3, 3) | (5, 8, 3, 4, 2) | (3, 6, 2, 4, 0) |

As has been described, in at least one embodiment, a plurality of vectors each comprising M equal size chunks is reduced through parallel pipelined processing by N processes. During each of log(N)+M steps of processing (for N an integer power of two), a process may send one chunk of the vector (original input data or intermediate result of the reduce operation) and may receive a different chunk. The communication of the chunks follows a predetermined communication schedule such that a maximum of one chunk is sent to the same process during any given step and most processes are involved in both sending and receiving chunks.

While various embodiments have been particularly shown as described with reference to a preferred embodiment, it will be understood by those skilled in the art that various changes in form and detail may be made therein without departing from the spirit and scope of the claims. For example, although aspects have been described with respect to a computer system executing program code that directs the functions of the present invention, it should be understood that present invention may alternatively be implemented as a program product including a computer readable storage medium (e.g., flash memory, DRAM, hard disk, optical disk) storing program code that can be processed by a data processing system. In addition, although a Reduce operation has been described herein with reference to the specific example of an MPI_REDUCE operation, it should be understood that the Reduce operation disclosed herein is equally applicable to other implementations of Reduce operations employing parallel processing. Further, although the disclosed Reduce operation builds two or three integer arrays governing the inter-process communication schedule, it should be understood that one or more other types of data structures can alternatively be employed and that the inter-process communication schedule can be governed by at least one data structure.

What is claimed is:

1. A method of vector reduction in a parallel processing data processing system, said method comprising:

the data processing system building at least one data structure indicating a communication schedule for a plurality of processes each having a respective one of a plurality of equal length vectors formed of multiple equal size chunks;

the data processing system, based upon the at least one data structure, communicating chunks of the plurality of vectors among the plurality of processes and performing partial reduction operations on chunks in accordance with the communication schedule; and the data processing system storing a result vector representing reduction of the plurality of vectors, wherein building at least one data structure includes:

building at least one data structure indicating a binary representation of an integer rank of each of the plurality of processes;

building at least one data structure indicating a distance in the binary representation to a bit of a given value; and building, when the plurality of processes is not an integer power of two, at least one data structure indicating the number of non-zero bits between the right most bit and a bit at a given position in the binary representation.

2. The method of claim 1, wherein during each of a plurality of steps in the communication schedule, each of the plurality of processes sends at most one of the number of chunks of a partial result vector and receives at most one of the number of chunks.

3. The method of claim 1, wherein:
the plurality of processes is N processes;
N is an integer power of two;
M is a number of the chunks per vector; and
the data processing system reduces the plurality of vectors in exactly log(N)+M steps of parallel processing by the N processes.

4. The method of claim 1, wherein:
the plurality of processes is N processes;
N is not an integer power of two and N' is a largest integer power of two less than N;
M is a number of the chunks per vector;
the data processing system reduces the plurality of vectors in log(N')+M+1 steps of parallel processing by the plurality of processes.

5. The method of claim 4, further includes:
organizing the N processes into N' units each having one or two processes;
assigning to processes in each of the N' units different roles in carrying out each of a plurality of steps of the communication schedule.

6. A program product for vector reduction in a parallel processing data processing system, said program product comprising:
a computer-readable data storage device; and
program code stored within the computer-readable data storage device, wherein the program code causes the data processing system to:
build at least one data structure indicating a communication schedule for a plurality of processes each having a respective one of a plurality of equal length vectors formed of multiple equal size chunks;
based upon the at least one data structure, communicate chunks of the plurality of vectors among the plurality of processes and perform partial reduction operations on chunks in accordance with the communication schedule; and
store a result vector representing reduction of the plurality of vectors,
wherein the program code causes the data processing system to build:
at least one data structure indicating a binary representation of an integer rank of each of the plurality of processes;
at least one data structure indicating a distance in the binary representation to a bit of a given value; and
if the plurality of processes is not an integer power of two, at least one data structure indicating the number of non-zero bits between the right most bit and a bit at a given position in the binary representation.

7. The program product of claim 6, wherein during each of a plurality of steps in the communication schedule, the program code further causes each of the plurality of processes to send at most one of the number of chunks of a partial result vector and receive at most one of the number of chunks.

8. The program product of claim 6, wherein:
the plurality of processes is N processes;
N is an integer power of two;
M is a number of the chunks per vector; and
the program code causes the data processing system to reduce the plurality of vectors in exactly log(N)+M steps of parallel processing by the plurality of processes.

9. The program product of claim 6, wherein:
the plurality of processes is N processes;
N is not an integer power of two and N' is a largest integer power of two less than N;
M is a number of the chunks per vector;
the program code causes the data processing system to reduces the plurality of vectors in log(N')+M+1 steps of parallel processing by the plurality of processes.

10. The program product of claim 9, wherein the program code causes the data processing system to:
organize the N processes into N' units each having one or two processes;
assign to processes in each of the N' units different roles in carrying out each of a plurality of steps of the communication schedule.

11. A parallel processing data processing system for performing vector reduction, said data processing system comprising:
at least one processor;
a computer readable data storage medium coupled to the at least one processor; and
program code stored within the computer readable data storage medium and executable by the at least one processor to:
build at least one data structure indicating a communication schedule for a plurality of processes each having a respective one of a plurality of equal length vectors formed of multiple equal size chunks;
based upon the at least one data structure, communicate chunks of the plurality of vectors among the plurality of processes and perform partial reduction operations on chunks in accordance with the communication schedule; and
store a result vector representing reduction of the plurality of vectors,
wherein the at least one data structure includes:
at least one data structure indicating a binary representation of an integer rank of each of the plurality of processes;
at least one data structure indicating a distance in the binary representation to a bit of a given value; and
if the plurality of processes is not an integer power of two, at least one data structure indicating the number of non-zero bits between the right most bit and a bit at a given position in the binary representation.

12. The data processing system of claim 11, wherein during each of a plurality of steps in the communication schedule, the program code further causes each of the plurality of processes to send at most one of the number of chunks of a partial result vector and receive at most one of the number of chunks.

13. The data processing system of claim 11, wherein:
the plurality of processes is N processes;
N is an integer power of two;
M is a number of the chunks per vector; and
the program code causes the data processing system to reduce the plurality of vectors in exactly log(N)+M steps of parallel processing by the plurality of processes.

14. The data processing system of claim 11, wherein:
the plurality of processes is N processes;
N is not an integer power of two and N' is a largest integer power of two less than N;
M is a number of the chunks per vector;

the program code causes the data processing system to reduces the plurality of vectors in $\log(N')+M+1$ steps of parallel processing by the plurality of processes.

15. The data processing system of claim 14, wherein the program code causes the data processing system to:
   organize the N processes into N' units each having one or two processes;
   assign to processes in each of the N' units different roles in carrying out each of a plurality of steps of the communication schedule.

* * * * *